United States Patent [19]

Robinson et al.

[11] 4,087,514

[45] * May 2, 1978

[54] PROCESS FOR DESULFURIZING CHAR

[75] Inventors: Leon Robinson, Houston, Tex.; Hans F. Bauer, Diamond Bar, Calif.

[73] Assignee: Occidental Petroleum Corporation, Los Angeles, Calif.

[*] Notice: The portion of the term of this patent subsequent to Nov. 11, 1992, has been disclaimed.

[21] Appl. No.: 630,556

[22] Filed: Nov. 10, 1975

Related U.S. Application Data

[63] Continuation-in-part of Ser. No. 401,408, Sep. 27, 1973, Pat. No. 3,919,118.

[51] Int. Cl.² .................... C01B 57/00; C01B 31/20
[52] U.S. Cl. ................................ 423/461; 423/460; 201/17

[58] Field of Search ............... 423/445, 448, 449, 450, 423/453, 455, 456, 457, 458, 460, 461; 201/17

[56] References Cited

U.S. PATENT DOCUMENTS

| | | | |
|---|---|---|---|
| 3,166,483 | 1/1965 | Masciantonio | 423/461 |
| 3,919,118 | 11/1975 | Robinson et al. | 423/461 |

FOREIGN PATENT DOCUMENTS

| | | | |
|---|---|---|---|
| 2,445,549 | 4/1975 | Germany | 423/461 |

*Primary Examiner*—O. R. Vertiz
*Assistant Examiner*—Gary P. Straub
*Attorney, Agent, or Firm*—Forrest E. Logan

[57] ABSTRACT

A process for reducing the sulfur content of char by means of a basic molten bath of an alkali metal or alkaline earth metal salt of a hydroxyaryl or an alcohol.

29 Claims, No Drawings

PROCESS FOR DESULFURIZING CHAR

This application is a continuation-in-part of copending application Ser. No. 401,408 filed Sept. 27, 1973, now U.S. Pat. No. 3,919,118.

BACKGROUND OF THE INVENTION

Commercial desulfurization techniques only remove a portion of the sulfur present in chars. This is inadequate for purposes of complying with air purity standards which limit the amount of sulfur dioxide produced by the use of chars as a fuel. The need for a relatively sulfur-free char has therefore become very important, especially in view of dwindling supplies of oil and natural gas and abundant supplies of coal.

Conventional commercial methods for desulfurizing char generally attempt to desulfurize the carbonaceous material from which the char is manufactured, such as coal, rather than treating the char itself. Sulfur is more readily removed from coal than char because the conversion to char causes reactions between the sulfur and the inorganic and organic compounds in the coal which "fixes" the sulfur in the resultant char thereby making it much more difficult to remove.

One method for desulfurizing coal is by crushing and grinding the coal into fines which are introduced into a fluid medium to allow the sulfur in the form of $FeS_2$ (pyrite) to form a separate layer which is mechanically removed from the coal. This technique, however, does not remove the $FeS_2$ embedded in the uncrushed coal and does not remove any of the sulfur present in other inorganic compounds and in organic compounds.

Another method is to treat coal with hydrogen gas to leach out the sulfur by reacting therewith to form hydrogen sulfide gas.

A hot molten mixture of sodium and potassium hydroxide has also been used to leach sulfur from finely divided coal. The art discloses that the sulfur is leached out by the molten caustic only after the coal is in a semi-fluid or "plastic" condition. Char, however, does not become semi-fluid or plastic.

SUMMARY OF THE INVENTION

It has been discovered that the sulfur content in coal char can be greatly reduced if the char is treated in a basic molten bath comprising an alkali metal or alkaline earth metal salt of a hydroxyaryl or an alcohol.

EMBODIMENT OF THE INVENTION

In practicing the method of the instant invention, the char is treated in a basic molten bath comprising an alkali metal or an alkaline earth metal salt of a hydroxyaryl or an alcohol. The term "hydroxyaryl" herein is meant to encompass (1) substituted hydroxyaryls with substituents such as amino, or alkoxy, or thio ether groups, and (2) unsubstituted hydroxyaryls such as alkyl substituted benzenes, naphthalenes, anthracenes, phenanthracenes, and the like having one or more hydroxyl groups.

Typical hydroxyaryls employed in the present process include phenol, cresol, catechol, resorcinol, hydroquinone, ethyl phenol, butyl phenol, didodecyclphenol, trimethylphenol; -tert-butylphenol, hexylresorcinol, naphthol, naphthoquinone, hydroxyanthracene, hydroxyphenanthrene. For example, such basic molten bath can comprise lithium, sodium, potassium calcium, or magnesium phenolate, naphtholate, phenantrolate, anthranolate, or any homologs of the aforementioned compounds, or lithium, sodium, potassium, calcium or magnesium methanolate, ethanolate, propanolate, cyclohexanolate, allylalcoholate, or the like, or any mixtures thereof.

The term "alcohol" herein is meant to encompass substituted or unsubstituted alkyl, cycloalkyl or alkenyl straight and branched hydrocarbons having one or more hydroxyl groups. Typical alcohols employed in the present invention include methanol, ethanol, 1-propanol, 2-propanol, 1-butanol, 2-butanol, tert-butyl alcohol, 1-pentanol, 3-hexanol, 2-octanol, 5-dodecanol, allyl alcohol, cyclohexanol, cyclopentanol, benzyl alcohol, diphenyl carbinol, triphenyl carbinol, ethylene glycol, propylene glycol and halogen substituted alcohols.

The molten bath is maintained basic. By basic as used herein is meant that if a small portion of the molten bath is removed and dissolved in water, that the aqueous solution will be basic when tested with litmus paper.

The basic molten bath may comprise a mixture of such materials and is not limited to either one alkali metal salt or one alkaline earth metal salt of one hydroxyaryl or one alcohol. Rather, any combination of these salts may be used.

In the preferred embodiment of the invention, the basic molten bath comprises an alkali metal salt of phenol, a substituted phenol such as cresol or xylenol or a mixture of phenols such as are found in creosote.

The term "cresylate" or "cresolate" herein is meant to encompass a mixture of the anions of monohydric phenols, cresols and their higher homologs. The alkali metal cresylate can be formed from an alkali metal compound and cresylic acid. The term "cresylic acid" herein is meant to encompass monohydric phenols, cresols and their higher homologs. The alkali metal compound is preferably sodium hydroxide, or potassium hydroxide or mixtures thereof.

The basic molten bath is heated to a temperature which will cause it to melt and form the alkali metal or alkaline earth metal salt of hydroxyaryl or alcohol. The char is then treated with the basic molten bath for a sufficient residence time and at a sufficiently high temperature to reduce the sulfur content of the char.

The temperature at which the char is treated must be high enough that a substantially molten bath is formed and low enough that substantial thermal decomposition of the molten bath does not occur.

It is preferable to have about two moles of alkali metal or one mole of alkaline earth metal compound per two moles of hydroxyaryl or alcohol. The bath can be maintained at a temperature between the melting temperature of the bath and about 750° C. Temperatures less than about 750° C are preferred because higher temperatures tend to cause problems with processing equipment and thereby increase the cost of operation. However, temperatures of about 500° F or higher are preferred in order to enhance the chemistry of the desulfurization reactions.

Preferably, the ratio of basic molten bath to char should be maintained at a level which will effect maximum desulfurization of the char. Preferably, this ratio is at least two parts by weight of basic molten bath per part by weight of char.

In the event the ratio of bath to char is less than two, it is preferred that about one part by weight of a thermal liquid, such as an aromatic oil or a paraffinic oil having boiling point above the bath temperature, be added to the bath for each part by weight of char to improve the contact between the char and the basic molten bath. The thermal liquid preferably is stable at the temperatures required by the process and does not readily decompose. An example of an aromatic oil is a thermal liquid sold by the Mobil Oil Company under the trade name "Mobiltherm 600."

Mobiltherm 600 thermal liquid has the following characteristics:

| Specific gravity 60/60F | 0.966 |
|---|---|
| Pour point, ° F | 0 |
| Flash point, ° F | 350 |
| Distillation Range, ° F | |
| 10% distillation | 640 |
| 50% distillation | 700 |
| 90% distillation | 760 |

An example of a paraffinic oil is a thermal liquid sold by the Mobil Oil Company under the trade name "Mobiltherm 603."

Mobiltherm 603 thermal liquid has the following characteristics:

| Specific gravity, 60/60F | 0.865 |
|---|---|
| Pour point, max., ° F | 20 |
| Flash point, min., ° F | 380 |
| Distillation Range, ° F | |
| 10% distillation | 680 |
| 50% distillation | 750 |
| 90% distillation | 820 |

To avoid loss of the thermal liquid at the higher temperature range of the preferred embodiment it is especially preferable to use the higher boiling fraction of the above thermal liquids.

When the char is introduced to the molten bath, it is preferably admixed therein by means of a motor-driven stirrer or other stirring, mixing or agitating means which will provide a thorough mixing of the char with the basic molten bath for intimate contact therebetween.

An inert gas, such as nitrogen gas, can be admixed into the mixture to eliminate the presence of oxygen therein and/or to provide an inert atmosphere above the bath. The elimination of oxygen from the bath, and the providing of an inert atmosphere above the bath, however, are not necessary to the practice of the instant invention but are preferred since oxidation of the sulfur compounds, it is believed, can produce a form of sulfur such as elemental sulfur which is more difficult to separate from the char and because the carbon content of the char can be reduced by oxidation with the free oxygen.

The period of intimate contact between the char and the basic molten bath is referred to as the residence time and is preferably about two to about sixty minutes. About thirty minutes to about sixty minutes is especially preferred for maximum desulfurization. Residence times greater than sixty minutes do not appear to enhance the degree of desulfurization. Residence times shorter than about ten minutes are not preferred because a higher degree of agitation is required to achieve the same degree of desulfurization as residence times in excess of about ten minutes.

After sufficient residence time, the char is removed from the basic molten bath, preferably by allowing it to rise to the surface of the bath where it is decanted or skimmed off by conventional flotation or other separation means such as filtration, centrifugation and the like. The char is preferably thereafter separated from the bath, preferably by washing with water to remove any inorganic residues, and then preferably by washing with organic solvents, such as acetone, methanol, tetrahydrofuran, polar ethers such as dioxane ether, alcohols, and hydroxyethers to remove any organic residues.

Preferably, the hydroxylaryl moiety or alcohol moiety remaining in the basic molten bath after desulfurization of the char, whether converted or unconverted by the desulfurization reaction, can be recovered by steam distillation and subsequently recycled for further use. Recycling the desulfurizing reagent is a substantial improvement over prior methods which consume the desulfurization reagents during the process.

In one embodiment the hydroxyaryl is cresylic acid which can be derived from coal tars. Since the invention is especially useful as an additional step in the conversion of coal into gaseous and liquid products, there is some economic incentive to use a cresylic acid from coal tar. Cresylic acid from coal tars can comprise the following pure chemicals: phenol, cresols, and xylenols, as well as other hydroxylaryls. For example, such a cresylic acid can have the following characteristics:

| CRESYLIC ACID | |
|---|---|
| Typical Composition | |
| Phenol, $C_6H_5OH$ | 0.2 to 0.5% |
| Ortho Cresol, $CH_3C_6H_4OH$ | 0 to 3% |
| Meta Para Cresol, $CH_3C_6H_4OH$ | 3 to 10% |
| 2,4- 2,5 Xylenol, $(CH_3)_2C_6H_3OH$ | 2 to 8% |
| 2,3- 3,5 Xylenol + Ethyl Phenol | 30 to 45% |
| 3,4- Xylenol, $(CH_3)_2C_6H_3OH$ | 8 to 15% |
| Higher Hydroxylaryls Balance | |
| Typical Properties | |
| Specific Gravity at 20/15.5° C | 1.025 |
| Color | Pale |
| Water | 0.4% |
| Boiling Range: | |
| 5% 218° /223° C | |
| 90% 230° /235° C | |

It is to be understood, however, that other sources of cresylic acid, such as cresylic acid from petroleum feed stocks or synthetic cresylic acid, or other hydroxyaryls or alcohols can be used.

The hydroxyaryls or alcohols act as a source of basic anions by proton loss having a thermal stability which is necessary for use in the method of the instant invention, and form alkali metal or alkaline metal salt when mixed with the appropriate caustic materials.

While we do not intend to be bound by theory, it is believed that the basic molten bath partially solvates the char thereby rendering the char in a condition where the sulfur can be leached therefrom.

It is further believed that the basic molten bath may be formed from alkali metal or alkaline earth metal salts of any other thermally stable fatty acid, aromatic carboxylic acid or other organic acid and that such basic molten baths will desulfurize char.

EXAMPLE I 33 parts by weight of sodium hydroxide were added to 100 parts by weight of cresylic acid. The resultant mixture was basic to a test by litmus paper and was in a dark viscous semi-solid condition. 155 grams of the semi-solid mixture was heated to 750° F under a nitrogen blanket. The solid was completely fluid at about 500° F. A 25-gram specimen of minus 60 mesh char prepared from a high volatile bituminous coal was admixed to the fluid mixture and stirred for 30 minutes while the temperature was maintained at 750° F. The mixture was cooled, the char was removed therefrom and washed with water to remove the inorganic residues and washed with acetone to remove organic residues. The washed specimen was thereafter dried at 212° F to remove any acetone or water and then analyzed. The results were as follows:

| Analysis by Weight Percent of Char Prior to Treatment with Organic Solvent-Caustic Bath | | | | | |
|---|---|---|---|---|---|
| Pyritic Sulfur | Sulfide Sulfur | Organic Sulfur | Total Sulfur | Ash | Moisture |
| Wet 1.36 | 0.80 | 1.92 | 3.36 | 28.27 | 1.15 |
| Dry 1.38 | 0.80 | 1.94 | 3.40 | 28.60 | (dry) |

| Analysis by Weight Percent of Char After Treatment with Organic Solvent-Caustic Bath | | | | | |
|---|---|---|---|---|---|
| Pyritic Sulfur | Sulfide Sulfur | Organic Sulfur | Total Sulfur | Ash | Moisture |
| Wet 0.02 | 0 | 0.42 | 0.44 | 16.88 | 5.77 |
| Dry 0.02 | 0 | 0.45 | 0.47 | 17.91 | (dry) |

A second run was made on another 25-gram specimen of the same char following the same procedure as set forth above.

The results of a second run are listed below:

| Initial | Total | Sulfide | Pyritic | Organic | Ash | Moisture |
|---|---|---|---|---|---|---|
| Char | 3.76 | 0.40 | 1.13 | 2.19 | 17.13 | 0.87 |
| Dry | 3.79 | 0.40 | 1.14 | 2.21 | 17.28 | 0 |
| After Treatment | 1.62 | 0.41 | 0.23 | 0.97 | 11.67 | 0.5 |
| Dry | 1.63 | 0.41 | 0.23 | 0.97 | 11.73 | 0 |

In addition to the above analysis on this material, carbon, hydrogen and nitrogen analysis were performed on the initial and after treatment chars. Since there is a loss in ash the results are given on a moisture ash free basis (MAF)

| Initial | Carbon | Hydrogen | Nitrogen | Oxygen | (by difference) |
|---|---|---|---|---|---|
| Char | 73.04 | 2.39 | 1.72 | 1.09 | |
| MAF | 89.07 | 2.91 | 2.10 | 1.33 | |
| After Treatment | 77.47 | 2.62 | 0.82 | 5.30 | |
| MAF | 88.20 | 2.98 | 0.93 | 6.03 | |

The data further indicates that nitrogen content of the treated char is substantially reduced from the untreated char.

The designation "wet" in the above table refers to the analysis of the water content of the char. The designation "dry" refers to the analysis of the same specimen of char discounting the presence of water and determining the weight percents of the nonaqueous constituents of the char. The above results indicate that the sulfur content of the char was reduced by about 86%.

EXAMPLE II 25 parts by weight of char containing 3.36% sulfur were mixed with 40 parts by weight of sodium cresylate and 139 parts by weight of Mobiltherm high temperature fluid. The mixture was heated to 650° F and stirred for 30 minutes. The mixture was cooled and the char removed by filtration and washed with water and acetone. The sulfur content of the char was analyzed at 0.83%, a 75% reduction.

EXAMPLE III 25 parts by weight of char containing 3.36% sulfur were mixed with 23.5 parts by weight of sodium cresylate and 139 parts by weight of Mobiltherm high temperature fluid. The mixture was heated to 675° F and stirred for 30 minutes. After washing, the char sulfur content was 1.2%, a 64% reduction.

The above method can be carried out employing the lithium, potassium, or sodium salts of phenol, cresol, catechol, resorcinol, butylphenol, methyl phenol or other hydroxylaryl in place of sodium cresylate.

EXAMPLE IV

A char containing 3.36% sulfur is mixed with about a five fold excess of the sodium salt of a α-naphthol in the weight ratio of 6 to 10. The mixture is heated to 750° F and stirred for 30 minutes. After cooling, the char is washed free of soluble sulfur forms as well as spent and unused reagent.

EXAMPLE V

A char containing 3.36% sulfur is mixed with about a five fold excess of the sodium salt of 3-phenanthrol in the weight ratio of 4 to 10. The mixture is heated to 750° F and stirred for 30 minutes. After cooling, the char is washed free of soluble sulfur forms as well as spent and unused reagent.

EXAMPLE VI

A char containing 3.36% sulfur is mixed with about a five fold excess of the potassium salt of α-anthrol in the weight ratio of 4 to 10. The mixture is heated to a fluid state and the slurry is stirred for 30 minutes. After cooling, the char is washed free of soluble sulfur forms as well as spent and unused reagent.

EXAMPLE VII

A char containing 3.36% sulfur is mixed with about nine fold excess of the sodium salt of neo-pentanol (2,2-dimethyl-propanol-1) in the weight ratio of 5 to 10. The mixture is heated to 700° F and stirred for 30 minutes. The mixture is cooled and the char is washed free of soluble sulfur forms as well as spent and unused reagent.

EXAMPLE VIII

A char containing 3.36% sulfur is mixed with about seven fold excess of the sodium salt of a p-methyl-cyclohexanol in the weight ratio of 5 to 10. The mixture is heated to 675° F and stirred for 30 minutes. The mixture is cooled after which the char is washed free of soluble sulfur forms and spent and unused reagent.

EXAMPLE IX

A char containing 3.36% sulfur is mixed with about a four fold excess of the sodium salt of n-tetradecyl alcohol in the weight ratio of 5 to 10. The mixture is heated to 675° F and stirred for 30 minutes. After cooling, the char is washed free of soluble sulfur forms as well as spent and unused reagent.

The above process can be carried out employing the lithium, sodium or potassium salt of methanol, ethanol, butanol, decanol, cyclohexanol, benzyl alcohol, ethylene glycol or other alcohols.

While the embodiment of the invention chosen herein for purposes of the disclosure is at present considered to be preferred, it is to be understood that this invention is intended to cover all changes and modifications in the disclosed embodiments which fall within the spirit and scope of the invention.

What is claimed is:

1. A process for reducing the sulfur content of char comprising the steps of:
   (a) treating char in a basic molten bath comprising an alkali metal or an alkaline earth metal salt of a hydroxylaryl or an alcohol; and
   (b) substantially separating said char from said basic molten bath.

2. A process for reducing the sulfur content of char, as recited in claim 1, wherein said basic molten bath consists essentially of an alkali metal or an alkaline earth metal salt of a hydroxyaryl or an alcohol.

3. A process for reducing the sulfur content of char, as recited in claim 1, wherein said basic molten bath contains a thermal liquid.

4. A process for reducing the sulfur content of char comprising the steps of:
   (a) treating char in a basic molten bath comprising an alkali metal salt of a phenol; and
   (b) substantially separating said char from said basic molten bath.

5. A process for reducing the sulfur content of char comprising the steps of:
   (a) treating char in a basic molten bath comprising an alkali metal cresylate; and
   (b) substantially separating said char from said basic molten bath.

6. A process for reducing the sulfur content of char, as recited in claim 5, wherein said basic molten bath consists essentially of an alkali metal cresylate.

7. A process for reducing the sulfur content of char comprising the steps of:
   (a) forming a basic molten bath comprising an alkali metal phenolate;
   (b) admixing char in said basic molten bath;
   (c) maintaining said char in said basic molten bath for a sufficient residence time and at a sufficiently high temperature to reduce the sulfur content of said char; and
   (d) substantially separating char from said basic molten bath.

8. A process for reducing the sulfur content of char, as recited in claim 7, wherein said basic molten bath consists essentially of an alkali metal phenolate.

9. A process for reducing the sulfur content of char comprising the steps of:
   (a) forming a basic molten bath from a mixture comprising
      (1) an alkali metal compound, and
      (2) cresylic acid;
   (b) admixing char in said basic molten bath;
   (c) maintaining said char in said basic molten bath for a sufficient residence time and at a sufficiently high temperature to reduce the sulfur content of said char; and
   (d) substantially separating char from said basic molten bath.

10. A process for reducing the sulfur content of char, as recited in claim 9, wherein said basic molten bath is formed from a mixture consisting essentially of
   (1) an alkali metal compound, and
   (2) cresylic acid.

11. A process for reducing the sulfur content of char, as recited in claim 9, wherein said alkali metal compound is a hydroxide.

12. A process for reducing the sulfur content of char, as recited in claim 11, wherein said char is maintained in said basic molten bath for a residence time between about two minutes and about sixty minutes and wherein said basic molten bath is maintained at a temperature between about 500° F and about 750° F.

13. A process for reducing the sulfur content of char, as recited in claim 12, wherein at least about two parts by weight of said mixture is maintained per part by weight of said char in said basic molten bath, and wherein about one mole part of said hydroxide is maintained per mole part of said cresylic acid in said basic molten bath.

14. A process for reducing the sulfur content of char, as recited in claim 12, wherein said basic molten bath comprises a thermal liquid, and wherein about one mole part of said hydroxide is maintained per mole part of said cresylic acid in said basic molten bath.

15. A process for reducing the sulfur content of char, as recited in claim 14, wherein said thermal liquid is an aromatic oil or a paraffinic oil.

16. A process for reducing the sulfur content of char comprising the steps of:
   (a) forming a basic molten bath from a mixture comprising
      (1) an alkali metal hydroxide, and
      (2) cresylic acid;
   (b) admixing char in said basic molten bath;
   (c) maintaining said char in said basic molten bath for a sufficient residence time and at a sufficiently high temperature to reduce the sulfur content of said char;
   (d) substantially separating said char from said basic molten bath;
   (e) treating a portion of said basic molten bath to regenerate cresylic acid; and
   (f) recycling said cresylic acid so regenerated to said basic molten bath.

17. A process for reducing the sulfur content of char, as recited in claim 16, wherein said basic molten bath is formed of a mixture consisting essentially of
   (1) an alkali metal hydroxide; and
   (2) cresylic acid.

18. A process for reducing the sulfur content of char, as recited in claim 16, wherein said alkali metal hydroxide is sodium hydroxide.

19. A process for reducing the sulfur content of char, as recited in claim 18, wherein said char is maintained in said basic molten bath for a residence time between about two minutes and about sixty minutes and wherein said basic molten bath is maintained at a temperature between about 500° F and about 750° F.

20. A process for reducing the sulfur content of char, as recited in claim 19, wherein said treating of a portion of said basic molten bath to regenerate cresylic acid is by steam distillation.

21. A process for reducing the sulfur content of char, as recited in claim 20, wherein said char is coal char.

22. A process for reducing the sulfur content of char, as recited in claim 21, wherein at least about two parts by weight of said mixture is maintained per part by weight of said char in said basic molten bath, and wherein about one mole part of said hydroxide is maintained per mole part of said cresylic acid in said basic molten bath.

23. A process for reducing the sulfur content of char, as recited in claim 21, wherein said basic molten bath contains a thermal liquid, and wherein about one mole part of said hydroxide is maintained per mole part of said cresylic acid in said basic molten bath.

24. A process for reducing the sulfur content of char, as recited in claim 23, wherein said thermal liquid is an aromatic oil.

25. A process for reducing the sulfur content of char, as recited in claim 24, wherein at least about one part by weight of said aromatic oil is maintained per part by weight of said char in said basic molten bath.

26. A process for reducing the sulfur content of char, as recited in claim 25 wherein said char is maintained in said basic molten bath for a residence time of about thirty minutes and wherein said basic molten bath is maintained at a temperature of about 750° F.

27. A process for reducing the sulfur content of char, as recited in claim 26, wherein said cresylic acid forming said basic molten bath is from the cresylic acid fraction from distillation of coal tar.

28. A process for reducing the sulfur content of char, as recited in claim 9, wherein said char is washed with water.

29. A process for reducing the sulfur content of char, as recited in claim 16, wherein said char is washed with water.

* * * * *